(12) United States Patent
Smallwood et al.

(10) Patent No.: US 10,927,957 B2
(45) Date of Patent: Feb. 23, 2021

(54) DEFLECTION SEAL SYSTEM

(71) Applicant: Rolls-Royce North American Technologies Inc., Indianapolis, IN (US)

(72) Inventors: Michel S. Smallwood, Greenwood, IN (US); Mark A. Herbertz, Bloomington, IN (US); Kenneth W. Froemming, Carmel, IN (US); Jack D. Petty, Indianapolis, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 205 days.

(21) Appl. No.: 16/109,251

(22) Filed: Aug. 22, 2018

(65) Prior Publication Data
US 2020/0063869 A1    Feb. 27, 2020

(51) Int. Cl.
| F16J 15/3256 | (2016.01) |
| F02C 7/28 | (2006.01) |
| F16J 3/04 | (2006.01) |
| F16J 15/3284 | (2016.01) |
| F16L 27/111 | (2006.01) |

(52) U.S. Cl.
CPC ........... *F16J 15/3256* (2013.01); *F02C 7/28* (2013.01); *F16J 3/042* (2013.01); *F16J 15/3284* (2013.01); *F16L 27/111* (2013.01); *F05D 2240/55* (2013.01); *F05D 2250/184* (2013.01)

(58) Field of Classification Search
CPC ...... F16J 15/3256; F16J 15/3284; F02C 7/28; F16L 27/111; F05D 2240/55; F05D 2250/184
See application file for complete search history.

(56) References Cited

U.S. PATENT DOCUMENTS

| 3,169,785 | A | 2/1965 | Ziebold |
| 4,378,945 | A | 4/1983 | Trautman |
| 5,340,165 | A | 8/1994 | Sheppard |
| 6,182,755 | B1 | 2/2001 | Mansure |
| 8,651,497 | B2 * | 2/2014 | Tholen ............... F01D 11/005 277/644 |
| 9,822,741 | B2 | 11/2017 | Holzmann et al. |
| 10,113,437 | B2 * | 10/2018 | Davis ................... F01D 25/246 |
| 10,370,992 | B2 * | 8/2019 | Ponchak ............... F01D 11/003 |
| 2009/0200268 | A1 | 8/2009 | Tappan et al. |
| 2013/0234407 | A1 | 9/2013 | Parrish et al. |
| 2016/0169022 | A1 | 6/2016 | Davis |
| 2017/0121032 | A1 | 5/2017 | Pantalone et al. |

OTHER PUBLICATIONS

Extended European Search Report, European Application No. 19191905.9-1007, dated Dec. 19, 2019, 10 pages.

* cited by examiner

*Primary Examiner* — Gilbert Y Lee
(74) *Attorney, Agent, or Firm* — Barnes & Thornburg LLP

(57) ABSTRACT

A seal assembly can accommodate deflection between two components through a cartridge that is slidingly engaged with a slide plate.

19 Claims, 2 Drawing Sheets

__US 10,927,957 B2__

DEFLECTION SEAL SYSTEM

GOVERNMENT LICENSE RIGHTS

This invention was made with government support under contract no. H2222-16-C-0121 awarded by U.S. Air Force. The U.S. government has certain rights in the invention.

BACKGROUND

The present disclosure relates generally to component for turbomachinery, and more specifically to components for turbomachinery such as gas turbine engines.

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

The relatively high temperatures generated, as well as the adapted uses of such gas turbine engines can impose relative movement on its components. Accommodating, relative movements between components can be challenging.

SUMMARY

The present disclosure may comprise one or more of the following features and combinations thereof.

According to one aspect of the present disclosure, a seal system for accommodating deflection between components may include an annular seal configured for flexible extension along an axial direction, a first flange for engagement with an axial end of the annular seal, the first flange including a base landing engaging the seal and a flange arm extending in the axial direction along a radial side of the annular seal, and a guidance system for protecting the annular seal. The guidance system may include a seal cartridge and a slide plate arranged to engage the seal cartridge for radial sliding. The seal cartridge may have a cartridge landing engaged with another axial end of the annular seal and a cartridge arm extending along the axial direction towards the first flange. The cartridge arm may be configured to overlap with the flange arm along the axial direction for radial engagement under radial movement of the first flange relative to the seal plate to urge the cartridge for radial sliding movement relative to the seal plate.

In some embodiments, one of the cartridge arm and the flange arm includes a dimple for engagement with the other one of the cartridge arm and the flange arm. The cartridge arm may be radially outward of the flange arm.

In some embodiments, the seal cartridge and the seal plate may be annular and/or may be arranged radially outward of a gas flow path. The first flange may be secured with a first component of a gas turbine engine exhaust system and the seal plate is fixed to a second component of a gas turbine engine exhaust system. The second component of a gas turbine engine exhaust system may be a heat signature suppression system for blocking against detection of a heat signature of the exhaust flow of the gas turbine engine.

In some embodiments, the another axial end of the annular seal may be engaged with the seal plate by spring force to allow radial sliding. The flange arm and the cartridge arm may be located radially outward of the annular seal. The seal cartridge may include an inner flange projecting axially from the cartridge landing. In some embodiments, the inner flange may be arranged radially inward of the annular seal.

According to another aspect of the present disclosure, a heat signature suppression system for blocking against detection of heat signature of engine exhaust may include a heat signature suppression conduit for conducting flow of engine exhaust while blocking against detection of heat signature of engine exhaust, the primary heat signature suppression conduit extending between an inlet for receiving engine exhaust flow and an outlet for discharging engine exhaust flow, and a seal system for accommodating deflection between components. The seal system may include an annular seal configured for flexible extension along an axial direction, a first flange for engagement with an axial end of the annular seal. The first flange may include a base landing engaging the seal and a flange arm extending in the axial direction along a radial side of the annular seal. The heat signature suppression system may include a guidance system for protecting the annular seal. The guidance system may include a seal cartridge and a slide plate secured with the inlet of the heat signature suppression conduit and arranged to engage the seal cartridge for radial sliding. The seal cartridge may have a cartridge landing engaged with another axial end of the annular seal and having a cartridge arm extending along the axial direction towards the first flange. The cartridge arm may be configured to overlap with the flange arm along the axial direction for radial engagement under radial movement of the first flange relative to the seal plate to urge the cartridge for radial sliding movement relative to the seal plate.

In some embodiments, one of the cartridge arm and the flange arm may include a dimple for engagement with the other one of the cartridge arm and the flange arm. The cartridge arm may be arranged radially outward of the flange arm. In some embodiments, the seal cartridge and the seal plate may be annular and/or may be arranged radially outward of a gas flow path.

In some embodiments, the first flange may be secured with a first component of a gas turbine engine exhaust system. The another axial end of the annular seal may be engaged with the seal plate by spring force to allow radial sliding. The flange arm and the cartridge arm may be located radially outward of the annular seal. In some embodiments, the seal cartridge may include an inner flange projecting axially from the cartridge landing. The inner flange may be arranged radially inward of the annular seal.

These and other features of the present disclosure will become more apparent from the following description of the illustrative embodiments.

DETAILED DESCRIPTION OF THE DRAWINGS

Figure 1:
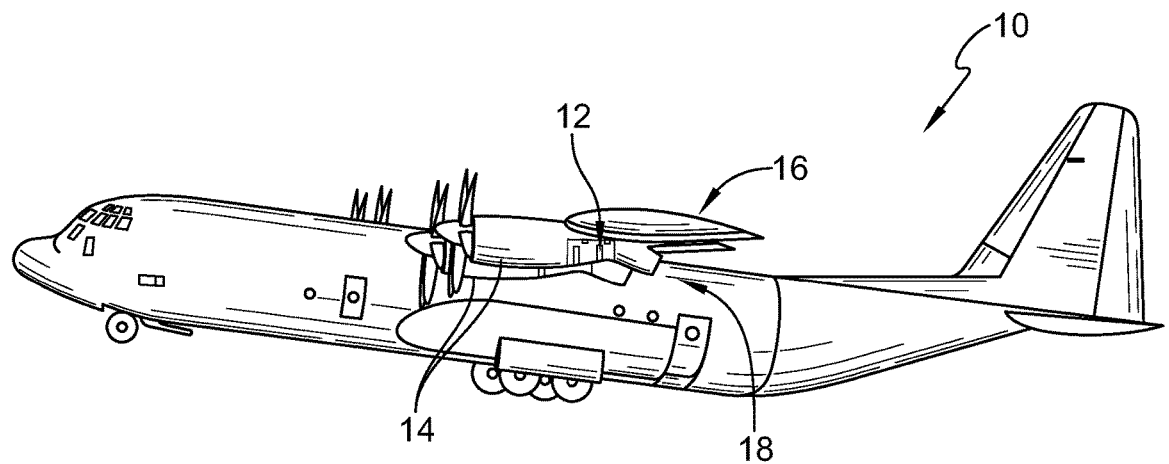
FIG. 1 is an elevation view of an aircraft including a number of underwing mounted gas turbine engines showing that heat signatures suppression systems are installed in communication with the gas turbine engine outlet to receive exhaust for passage to the environment while blocking against detection of heat signatures.

For the purposes of promoting an understanding of the principles of the disclosure, reference will now be made to a number of illustrative embodiments illustrated in the drawings and specific language will be used to describe the same.

Among industrial components, relative movement can be required and/or desired to accommodate various states. For example, thermal changes in component size can be accompanied by relative movement at the joining points of two components. In gas turbine engines and their adapted uses, for example, adapted for use aircrafts, relative movement between components can occur due to thermal expansion, operational stress, and/or other use factors.

In ducting which carries high temperature gas flow for the gas turbine engine, various seals can be used to join different components. Those components may experience relative movement whether axial, radial, and/or otherwise. Accommodating those relative movements while maintaining gas flow paths can create challenges to protecting seal materials from harm.

As shown in FIG. 1, an aircraft 10 is shown having a heat signature suppression system 12 for blocking detection of the heat signature left by its exhaust discharge. The aircraft 10 is illustratively powered by a number of gas turbine engines 14, embodied as turboprop gas turbine engines. The engines are illustratively secured underneath of wings 16 and provide thrust to propel the aircraft 10 by combustion of fuel mixed with oxygen. The combustion process generates hot exhaust products which drive the turbine of the engine. Upon discharge of exhaust flow to the environment, the heat remaining within the flow and/or hot components visible through the outlet of the engine can be detected, for example, by infrared cameras. The heat signature suppression system 12 can reduce direct line of sight into the outlet of the exhaust to assist in avoiding detection. In FIG. 1, the heat signature suppression system 12 receives exhaust flow from the gas turbine engine 14 and guides the exhaust flow to its outlet 18 for discharge.

Figure 2B:
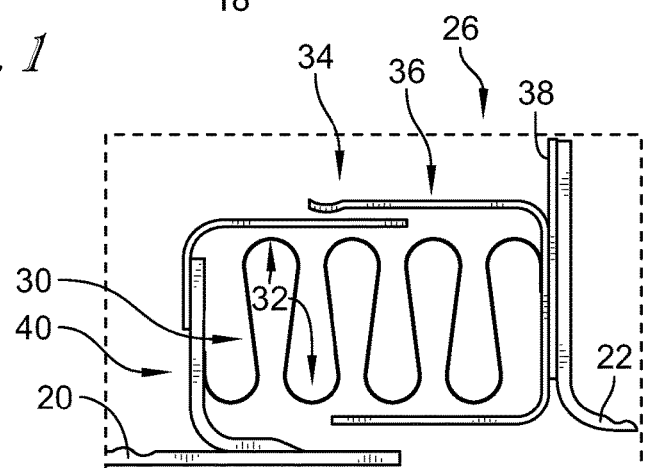
FIG. 2B is a cross-sectional view of a portion of the seal system of FIG. 2A taken along the axial direction at the 12 o'clock position when facing axially forward (facing into the outlet) along the exhaust flow, showing that the seal system includes an annular seal disposed between a flange connected with the exhaust conduit and a guidance system, the guidance system including a cartridge slidingly mounted on a slide plate that is connected with the heat suppression system conduit to protect the annular seal under radial movement (movement up and/or down in the orientation of FIG. 3) between the exhaust conduit and the heat suppression system conduit.
Figure 2A:
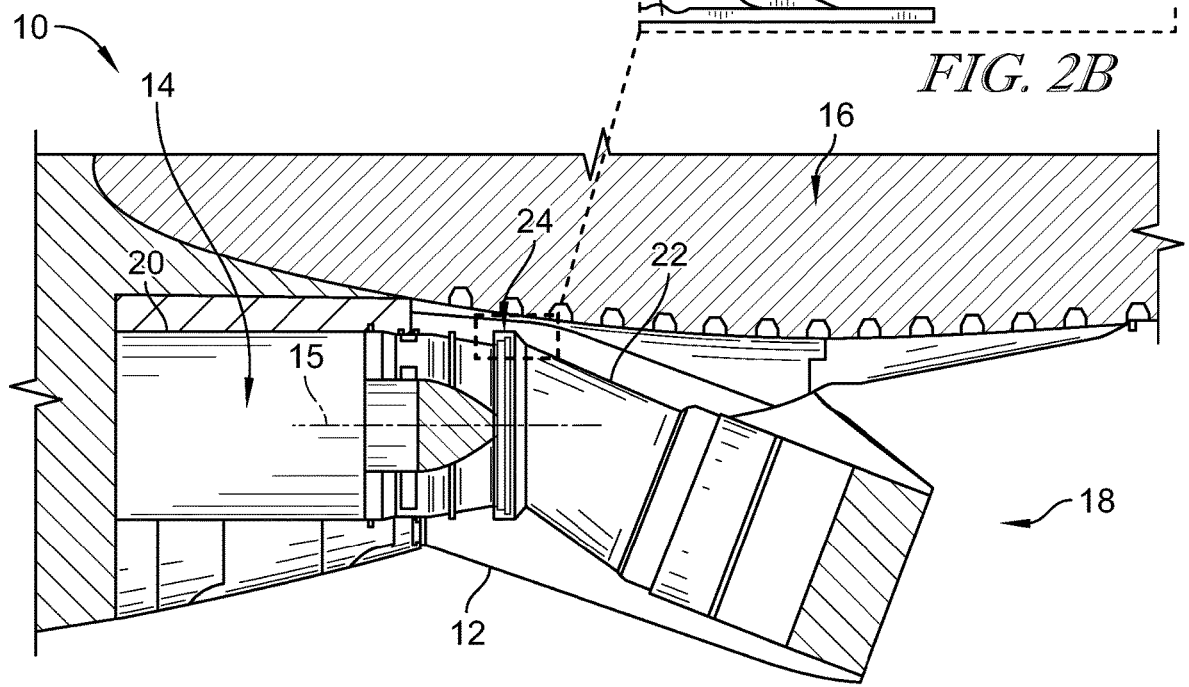
FIG. 2A is a closer elevation view of the outlet of the gas turbine engine exhaust and the heat signature suppression system of FIG. 1 having an outer portion removed to reveal that a seal system is arranged to guide exhaust flow from the exhaust conduit to the heat signature suppression conduit for discharge to the environment while blocking against detection of heat signatures.

As shown in FIG. 2A, the heat suppression systems 12 is connected with the gas turbine engine 16 to receive communication of exhaust flow. The gas turbine engine includes an exhaust conduit 20 that interfaces with a heat suppression conduit 22 of the heat suppression system 12. In FIG. 2A, various components of the gas turbine engine 16 are not In the illustrative embodiment, the conduits 20, 22 are in communication by connection 24. The connection 24 is formed by a seal system 26 which guides exhaust flow while permitting relative movement between the conduits 20, 22.

As shown in FIGS. 2A and 2B, the seal system 26 includes a seal 30 formed to have annular shape about an axis 15 to extend about the annular shape of the conduits 20, 22, (although in some embodiments, any suitable conduit and corresponding seal shape may be applied). Referring to FIG. 2B, the seal 30 is embodied as a bellow seal, having folds 32 extending in succession along the axial direction. The seal 30 is configured to accommodate axial and/or relative radial movement between the conduits 20, 22. For example, the folds 32 create an accordion-like extension to allow axial and/or radial flexibility while guiding exhaust flow between the conduits 20, 22. Issues can occur when relative movement between the conduits results in a collision and/or pinching of the seal due to the extent and/or sequence of the movement.

Referring to FIG. 2B, the seal system 26 includes a guidance system 34 for protecting the seal 30. The guidance system 26 illustratively includes a cartridge 36 and a slide plate 38 to accommodate relative movement. The cartridge 36 engages the seal 30 and the seal plate 38, and slides relative to the slide plate 38 to accommodate relative movement.

Figure 3:
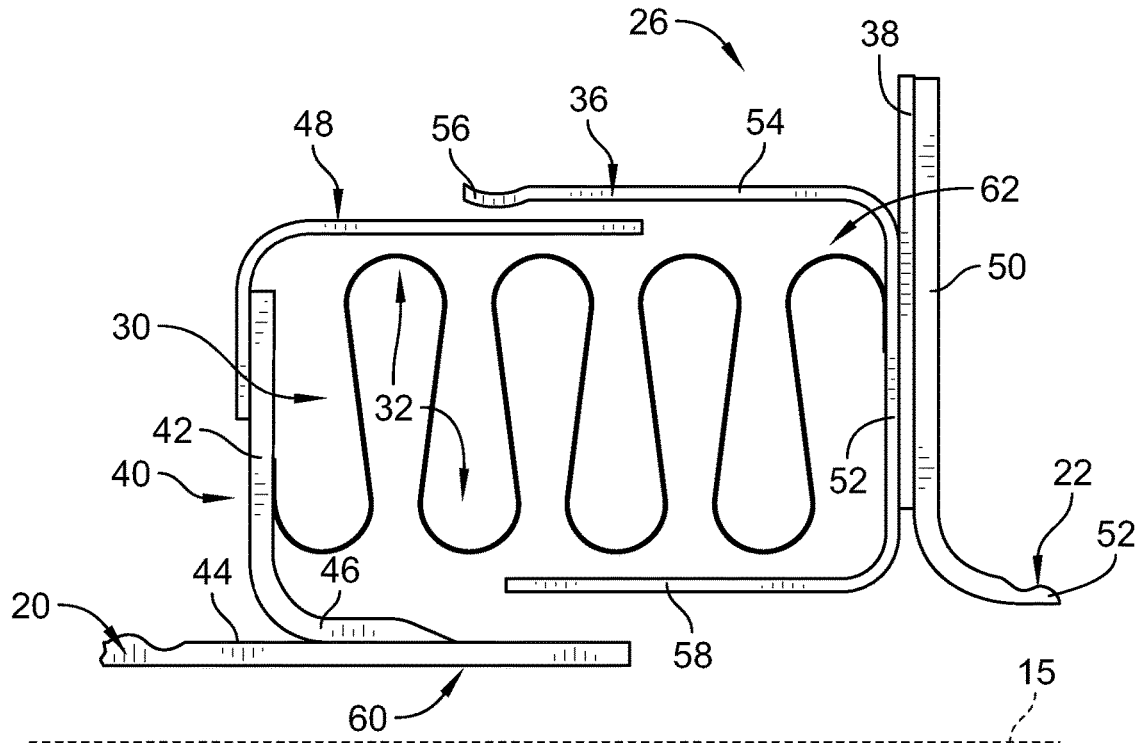
FIG. 3 is a closer view of the cross-sectional view of FIG. 2B showing that the cartridge includes a landing and an outer arm and an inner flange extending axially (left and right in the orientation of FIG. 3), and showing that the outer cartridge arm includes a dimple for engagement with the flange of the exhaust conduit to slide the cartridge radially outward (upward in the orientation of FIG. 3) relative to the slide plate.

As shown in FIG. 3, the exhaust conduit 20 includes a flange 40 for engagement with the seal 30 on one axial end thereof. The flange 40 is embodied as an annular extension of the conduit 20. The flange 40 includes a landing 42 for engagement with the seal 30, the landing 42 secured with the outer wall 44 of the conduit 22 and extending radially outward therefrom. In the illustrative embodiment the landing 42 is secured with the outer wall 44 by connection with an arm 46 extending axially and joined with the outer wall 44, although in some embodiment, the arm 46 may be and outer wall 44 may be integral with each other such that the landing 42 is connected with the outer wall 44 directly. The flange 40 includes an arm 48 extending axially from the landing 42 toward the heat suppression system 12.

Referring to FIG. 3, the heat suppression conduit 22 includes a radial base 50 extending from an outer wall 52. The slide plate 38 is fixedly connected with the base 50 to prevent relative movement. The cartridge 36 engages the other axial end of the seal 30. In the illustrative embodiment, the cartridge 36 is held against the slide plate 38 (for relative sliding) by the pressure force of the seal 30 in the aft direction.

The cartridge 36 is embodied as an annular member for protecting the seal 30. The cartridge 36 illustratively includes a landing 52 engaged with the slide plate 38. The landing 52 is engaged with the other axial end of the seal 30. The cartridge 36 includes an arm 54 extending axially from the landing 52 towards the exhaust conduit 20 for engagement with the arm 48 of the flange 40. The arm 54 includes a dimple 56 for engagement with the arm 48. The dimple 56 is embodied as a rolled bead providing a defined point of contact for the arm 54. The dimple 56 is illustratively disposed near an axially forward end of the arm 54 to have a convex shape facing the arm 48.

Upon radially outward movement of the flange 40, the arm 48 engages the arm 54 and can drive the cartridge 36 outward for sliding along the slide plate. The seal 30 remaining in contact with each of the flange 40 and cartridge 36 is moved according to the movement of each of the flange 40 and the cartridge 36. As the cartridge 36 and flange 40 are each annular, the other portions of their annular form drive the cartridge 36 in the opposite direction (e.g., back towards an original position) as discussed in additional detail below.

Referring to FIG. 3, the cartridge 36 illustratively includes an inner arm 58 that extends axially from the case 50 towards the exhaust conduit 20. In the illustrative embodiment, the arm 58 overlaps in the axial direction with an extension 60 of the exhaust conduit 20 to enclose the seal 30 along its axial extent. The overlap between the arm 58 and extension 60 can block against pinching of the seal 30 between the conduits 20, 22 and/or can encourage exhaust flow to remain inwardly from the seal 30.

As discussed above, the guide system 26 can complement the seal 30 to provide deflection capability. The guide system 26 can define an annular cavity 62 for housing the seal 30 to accommodate relative movement between the conduits 20, 22. Allowing the coordinated sliding of the cartridge along the seal plate can accommodate relative motion while protecting the seal.

Figure 4A:
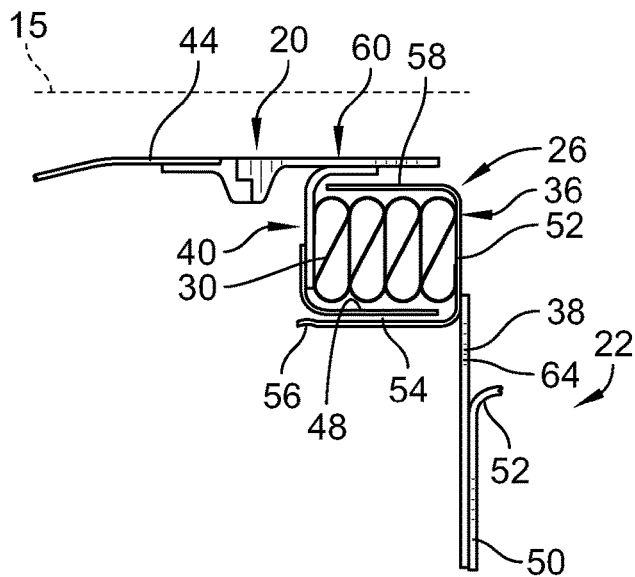
FIG. 4A is a cross-sectional view of a portion of the annular seal similar to FIG. 3 but taken along the axial direction at the 9 o'clock position (looking downward in the orientation of FIG. 2A) of the seal system from the orientation of FIG. 2A, showing the cartridge shifted radially inward.

Referring now to FIG. 4A, the guidance system 26 is illustratively shown having the cartridge 36 shifted radially inward at this location. For example, assuming that the conduits 20, 22 would ordinarily be arranged to have their walls 44, 52 generally at the same radial distance from the axis 15, the conduit 20 has moved inwardly relative to conduit 22. Contact between the conduit 20 and the cartridge 36 to drive the cartridge 36 to slide along the slide plate 38 would occur at the opposite circumferential position (3 o'clock position, in this instance) as discussed below with respect to FIG. 4B. Notably, the base 50 of the slide plate 38 includes a limb 64 extending radially inward relative to the wall 52 to allow additional movement of the cartridge 36 beyond the position of the wall 52. By example, the seal 30 is shown compressed in FIG. 4A, to indicate that the conduit 20 has moved closer to conduit 22 at this location.

Figure 4B:
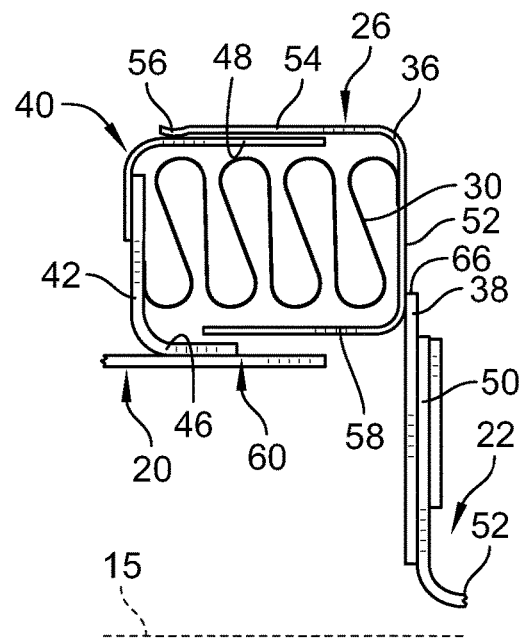
FIG. 4B is a cross-sectional view of a portion of the annular seal similar to FIGS. 3 and 4A but taken along the axial direction at the 3 o'clock position (looking downward in the orientation of FIG. 2A) of the seal system from the orientation of FIG. 2A, showing the cartridge shifted radially outward and corresponding with the radially inward shift at the 9 o'clock position shown in FIG. 4A.

Referring now to FIG. 4B, the guidance system 26 is illustratively shown having the cartridge 36 shifted radially outward at this location. The outward shift at the 3 o'clock position illustratively corresponds with the inward shift at the 9 o'clock position as shown in FIG. 4A. As previously mentioned, the dimple 56 of the cartridge 36 has been engaged by the arm 48 to drive the cartridge 36 radially outward at this location. With the annular nature of the cartridge 36, the radially outward driving of the cartridge 36 at this location causes radially inward movement at the 9 o'clock position as shown in FIG. 4A.

The slide plate 38 at the 3 o'clock position of FIG. 4B, illustratively includes a limb 66 extending radially outward from the base 38 beyond the base 50 of the conduit 22 to provide additional movement of the cartridge 36 beyond the position of the base 50. By example, in FIG. 4B the seal 30 is shown partially compressed, but less compressed than in FIG. 4A, to indicate that the conduit 20 has moved slightly closer to conduit 22 at this location, and has articulated from a centered position relative to conduit 22.

The present disclosure includes devices, systems, and methods for accommodating deflection between components. While exemplary embodiments include a seal system disposed between a conduit of a gas turbine engine exhaust conduit and a heat suppression system conduit, suitable examples of which may be found as disclosed within either of U.S. patent application Ser. Nos. 15/661,611 and 15/731,403, the disclosures of which are hereby incorporated by reference, in their entireties, including but not limited to those portions related to aircraft, gas turbine engines, and heat signature suppression systems, features of the present disclosure may apply to any particular engagement of components, for example, any joining of conduits which may endure relative movement in operation. In the exemplary embodiments, the seal system is arranged to accommodate relative axial movement of the conduits up to 1 inch, but in some embodiments, the seal system may be arranged to accommodate relative axial movement of the conduits within the range of about 0 to about 20 inches. In some embodiments, the devices, systems, and methods of the present disclosure may be arranged to accommodate any suitable axial movement range.

The present disclosure includes description of an inner arm 58 of the cartridge 36 which can assist in protecting the seal 30. For example, the inner arm 58 alone and/or together with the extension 60 can encourage exhaust flow away from the seal 30 and/or can reduce the impact of high velocity exhaust flow on the seal. However, in some embodiments, the arm 58 and/or extension 60 may be excluded.

Bellows seals are often used in applications where there is significant movement of one component with respect to another component along the axis of the bellows centerline. However, bellows seals may not be designed to accommodate significant lateral (radial) deflection (perpendicular to the bellows centerline axis) within a relatively short axial distance along the bellows centerline. As a result, bellows seals may not be applied between components having significant relative movement with respect to another in the lateral direction (i.e., along the perpendicular axis).

There is need for a sealing arrangement that could tolerate large relative lateral motion as well as significant axial motion between two components. In some instances, one component may be fixed with respect to the other. In the illustrative embodiments, the arrangement includes limited axial clearance but in some embodiments, axial clearances may be any suitable amount. The present disclosure includes devices, systems, and methods to accommodate the large lateral (radial) relative movement in limited axial spaces.

The disclosure includes a seal system having a cartridge to protect the bellows as it slides laterally (radially) relative to an added elongated plate. This plate can be locally increased in width along the lateral direction to accommodate, up to 2.1 inches of relative motion between the two components, but in some embodiments, any suitable dimensions may be applied to accommodate any suitable amounts of relative motion.

The present disclosure includes a seal captured within the cavity formed by the cartridge, or by the cartridge and by a first component together. Arrangements within the present disclosure can protect the seal from rubbing directly on the second component during transient events where component 1 moves with respect to component 2 along the lateral axis of the seal. Arrangements within the present disclosure can protect the seal from environmental factors such as direct exposure to hot and high velocity gases which could excite the seal. The seal plate can protect component 2 from wear as a result of the cartridge sliding along the lateral axis. The seal plate can be configured to provide additional surface on which the cartridge may slide along the lateral axis. That is, the seal plate can be elongated along the lateral axis to provide a longer surface to act upon.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A seal system for accommodating deflection between components, comprising:
    an annular seal configured for flexible extension along an axial direction;
    a first flange for engagement with an axial end of the annular seal, the first flange including a base landing engaging the seal and a flange arm extending in the axial direction along a radial side of the annular seal; and
    a guidance system for protecting the annular seal, the guidance system including a seal cartridge and a slide plate arranged to engage the seal cartridge for radial sliding, the seal cartridge having a cartridge landing engaged with another axial end of the annular seal and having a cartridge arm extending along the axial direction towards the first flange, wherein the cartridge arm is configured to overlap with the flange arm along the axial direction to enclose the annular seal along an axial extent of the annular seal such that the flange arm radially engages the cartridge arm under radial movement of the first flange relative to the slide plate to urge the cartridge for radial sliding movement relative to the slide plate.

2. The seal system of claim 1, wherein one of the cartridge arm and the flange arm includes a dimple for engagement with the other one of the cartridge arm and the flange arm.

3. The seal system of claim 2, wherein an axial extent of a portion of the cartridge arm that overlaps the flange arm is radially outward of an axial extent of a portion of the flange arm that overlaps the cartridge arm.

4. The seal system of claim 1, wherein the seal cartridge and the slide plate are annular and are arranged radially outward of a gas flow path.

5. The seal system of claim 1, wherein the first flange is secured with a first component of a gas turbine engine exhaust system and the slide plate is fixed to a second component of a gas turbine engine exhaust system.

6. The seal system of claim 5, wherein the second component of a gas turbine engine exhaust system is a heat signature suppression system for blocking against detection of a heat signature of the exhaust flow of the gas turbine engine.

7. The seal system of claim 1, wherein the another axial end of the annular seal is engaged with the slide plate by spring force to allow radial sliding.

8. The seal system of claim 1, wherein an axial extent of a portion of the flange arm that overlaps the cartridge arm and an axial extent of a portion of the cartridge arm that overlaps the flange arm are located radially outward of the annular seal.

9. The seal system of claim 8, wherein the seal cartridge includes an inner flange projecting axially from the cartridge landing.

10. The seal system of claim 9, wherein the inner flange is arranged radially inward of the annular seal.

11. A heat signature suppression system for blocking against detection of heat signature of engine exhaust, the heat signature suppression system comprising:
    a heat signature suppression conduit for conducting flow of engine exhaust while blocking against detection of heat signature of engine exhaust, the primary heat signature suppression conduit extending between an inlet for receiving engine exhaust flow and an outlet for discharging engine exhaust flow; and
    a seal system for accommodating deflection between components, the seal system including an annular seal configured for flexible extension along an axial direction, a first flange for engagement with an axial end of the annular seal, the first flange including a base landing engaging the seal and a flange arm extending in the axial direction along a radial side of the annular seal, and a guidance system for protecting the annular seal, the guidance system including a seal cartridge and a slide plate secured with the inlet of the heat signature suppression conduit and arranged to engage the seal cartridge for radial sliding, the seal cartridge having a cartridge landing engaged with another axial end of the annular seal and having a cartridge arm extending along the axial direction towards the first flange, wherein the cartridge arm is configured to overlap with the flange arm along the axial direction to enclose the annular seal along an axial extent of the annular seal such that the flange arm radially engages the cartridge arm under radial movement of the first flange relative to the slide plate to urge the cartridge for radial sliding movement relative to the slide plate.

12. The heat signature suppression system of claim 11, wherein one of the cartridge arm and the flange arm includes a dimple for engagement with the other one of the cartridge arm and the flange arm.

13. The heat signature suppression system of claim 12, an axial extent of a portion of the cartridge arm that overlaps the flange arm is arranged radially outward of an axial extent of a portion of the flange arm that overlaps the cartridge arm.

14. The heat signature suppression system of claim 11, wherein the seal cartridge and the slide plate are annular and are arranged radially outward of a gas flow path.

15. The heat signature suppression system of claim 11, wherein the first flange is secured with a first component of a gas turbine engine exhaust system.

16. The heat signature suppression system of claim 11, wherein the another axial end of the annular seal is engaged with the slide plate by spring force to allow radial sliding.

17. The heat signature suppression system of claim 11, wherein an axial extent of a portion of the flange arm that overlaps the cartridge arm and an axial extent of a portion of the cartridge arm that overlaps the flange arm are located radially outward of the annular seal.

18. The heat signature suppression system of claim 17, wherein the seal cartridge includes an inner flange projecting axially from the cartridge landing.

19. The heat signature suppression system of claim 18, wherein the inner flange is arranged radially inward of the annular seal.

* * * * *